US012784433B2

(12) United States Patent
Watanabe et al.

(10) Patent No.: US 12,784,433 B2
(45) Date of Patent: Nov. 3, 2026

(54) OBJECT RECOGNITION APPARATUS, OBJECT RECOGNITION PROCESSING METHOD, AND NON-TRANSITORY RECORDING MEDIUM

(71) Applicant: SUBARU CORPORATION, Tokyo (JP)

(72) Inventors: Keiichi Watanabe, Tokyo (JP); Tsubasa Ono, Tokyo (JP); Yu Yoshida, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 165 days.

(21) Appl. No.: 19/011,837

(22) Filed: Jan. 7, 2025

(65) Prior Publication Data

US 2025/0148776 A1 May 8, 2025

Related U.S. Application Data

(63) Continuation of application No. PCT/JP2023/014322, filed on Apr. 7, 2023.

(51) Int. Cl.
*G06V 10/96* (2022.01)
*G06T 3/4053* (2024.01)
(Continued)

(52) U.S. Cl.
CPC ............ *G06V 10/96* (2022.01); *G06T 3/4053* (2013.01); *G06V 10/25* (2022.01); *G06V 20/58* (2022.01)

(58) Field of Classification Search
CPC ........ G06V 10/96; G06V 10/25; G06V 20/58; G06T 3/4053; G08G 1/16
See application file for complete search history.

(56) References Cited

U.S. PATENT DOCUMENTS

| | | | | |
|---|---|---|---|---|
| 8,791,835 B2 * | 7/2014 | Zhang | .................... | G08G 1/167 340/901 |
| 10,763,285 B2 * | 9/2020 | Shibata | ................. | G06F 9/3004 |

(Continued)

FOREIGN PATENT DOCUMENTS

| | | | |
|---|---|---|---|
| JP | 2003-084064 A | 3/2003 | |
| JP | 2005-090974 A | 4/2005 | |
| JP | 2018056838 A * | 4/2018 | ............. H04N 23/80 |

OTHER PUBLICATIONS

International Search Report received in PCT Application No. PCT/JP2023/014322, dated Jun. 27, 2023.

*Primary Examiner* — Mia M Thomas
(74) *Attorney, Agent, or Firm* — Rimon P.C.

(57) ABSTRACT

An object recognition apparatus performs an object recognition process based on measurement data of a ranging sensor and image data of a camera. The object recognition apparatus: performs a first object recognition process for a short-distance region, a second object recognition process for a middle-distance region, and a third object recognition process for a long-distance region; performs the object recognition process using the measurement data in the first object recognition process; performs the object recognition process using the measurement data and the image data in the second object recognition process; and adjusts, based on data on a traveling environment of a mobile body, respective time periods for which the first object recognition process and the second object recognition process are to be performed, or a ratio between respective ranges in which the first object recognition process and the second object recognition process are to be performed in a measurement range.

4 Claims, 10 Drawing Sheets

(51) Int. Cl.
*G06V 10/25* (2022.01)
*G06V 20/58* (2022.01)

(56) References Cited

U.S. PATENT DOCUMENTS

| | | | | |
|---|---|---|---|---|
| 11,550,061 | B2 * | 1/2023 | Smith | B60W 40/04 |
| 12,375,801 | B2 * | 7/2025 | Kimura | H04N 23/665 |
| 2013/0082874 | A1 * | 4/2013 | Zhang | G01S 19/48 340/936 |
| 2016/0182866 | A1 * | 6/2016 | Landqvist | H04N 23/60 348/143 |
| 2019/0198540 | A1 * | 6/2019 | Shibata | G06F 9/3004 |
| 2019/0362479 | A1 * | 11/2019 | Shibata | G06T 5/50 |
| 2022/0114810 | A1 * | 4/2022 | Kikuchi | B64C 39/024 |
| 2025/0095345 | A1 * | 3/2025 | Gupta | G06T 7/11 |
| 2025/0148744 | A1 * | 5/2025 | Watanabe | G06V 10/25 |
| 2025/0232403 | A1 * | 7/2025 | Tan | G06V 10/22 |

* cited by examiner

OBJECT RECOGNITION APPARATUS, OBJECT RECOGNITION PROCESSING METHOD, AND NON-TRANSITORY RECORDING MEDIUM

CROSS-REFERENCE TO RELATED APPLICATIONS

This application is continuation of International Application No. PCT/JP2023/014322, filed on Apr. 7, 2023, the entire contents of which are hereby incorporated by reference.

BACKGROUND

The disclosure relates to an object recognition apparatus, an object recognition processing method, and a non-transitory recording medium.

In automated driving techniques and advanced driver assistance systems for vehicles, an object detection technique has been developed that uses an imaging device, such as a monocular camera or a stereo camera, or a ranging sensor, such as a light detection and ranging or laser imaging detection and ranging (LiDAR) or a millimeter-wave radar. The ranging sensor measures a distance based on a reflection point group that has reflected irradiation waves. In recent years, an apparatus has been proposed that detects an object by combining or fusing image data generated by an imaging device and measurement data of a ranging sensor.

For example, Japanese Unexamined Patent Application Publication (JP-A) No. 2005-090974 proposes an apparatus that recognizes a preceding vehicle in front of an own vehicle by sensor fusion, and performs image processing by a simple and small amount of calculation. For example, JP-A No. 2005-090974 discloses the following technique. A preceding vehicle region is determined by a preceding vehicle region determining unit, based on clustering of ranging results of a scanning laser radar by a clustering processing unit. A captured image of at least the preceding vehicle region of a monocular camera is processed into data on a data-compressed edge binary image by an edge image calculation processing unit. The data on the edge binary image is collected as image feature value data by an edge binary image data collecting unit. By comparing the data with determination reference image feature value data, a recognition determination unit recognizes the preceding vehicle region as a preceding vehicle without performing complicated image processing with a large amount of calculation, such as correlation calculation or contour extraction of the captured image. A determination reference updating unit updates the determination reference image feature value data, and a predicted position updating unit updates prediction of a preceding vehicle position.

In addition, JP-A No. 2003-084064 proposes an apparatus that, when performing vehicle recognition using a laser radar, performs highly accurate recognition by eliminating reflections from a vehicle other than a front vehicle, a roadside object, etc. by fusing vehicle recognition by an image sensor. For example, JP-A No. 2003-084064 discloses the following technique. A CPU determines a reflection point group existing at substantially equidistant positions within a spread range of substantially a vehicle width as a vehicle candidate point group, based on positions of respective reflection points identified by a laser radar module. The CPU converts the vehicle candidate point group into a camera coordinate system of a CCD camera and compares it with a rectangular region extracted by a camera module.

The CPU determines that the vehicle candidate point group is the front vehicle when the vehicle candidate point group after the coordinate conversion substantially matches the rectangular region.

SUMMARY

An aspect of the disclosure provides an object recognition apparatus including a ranging sensor, a camera, and one or more processors. The ranging sensor is configured to measure at least distances to reflection points based on reflected waves of applied irradiation waves. The camera is configured to generate image data on an imaging range. The one or more processors are configured to perform an object recognition process based on measurement data of the ranging sensor and the image data of the camera. The one or more processors are configured to: perform, as the object recognition process, a predetermined first object recognition process for a short-distance region in which a distance from a predetermined base point is equal to or less than a first distance set as a minimum distance that allows for object recognition by the object recognition process based on the image data, a predetermined second object recognition process different from the first object recognition process, for a middle-distance region in which the distance from the predetermined base point is greater than the first distance and is equal to or less than a second distance set as an upper limit of a distance that allows for the object recognition by the object recognition process based on the image data, and a predetermined third object recognition process different from the first object recognition process and the second object recognition process, for a long-distance region in which the distance from the predetermined base point is greater than the second distance; perform the object recognition process using the measurement data in the first object recognition process; perform the object recognition process using the measurement data and the image data in the second object recognition process; and adjust, based on data on a traveling environment of a mobile body, respective time periods for which the first object recognition process and the second object recognition process are to be performed, or a ratio between respective ranges in which the first object recognition process and the second object recognition process are to be performed in a measurement range in which the object recognition process is to be performed.

An aspect of the disclosure provides an object recognition processing method including: performing an object recognition process based on measurement data of a ranging sensor and image data of a camera, the ranging sensor being configured to measure at least distances to reflection points based on reflected waves of applied irradiation waves, the camera being configured to generate the image data on an imaging range, the object recognition process including performing a predetermined first object recognition process for a short-distance region in which a distance from a predetermined base point is equal to or less than a first distance set as a minimum distance that allows for object recognition by the object recognition process based on the image data, performing a predetermined second object recognition process different from the first object recognition process, for a middle-distance region in which the distance from the predetermined base point is greater than the first distance and is equal to or less than a second distance set as an upper limit of a distance that allows for the object recognition by the object recognition process based on the image data, and performing a predetermined third object recognition process different from the first object recognition process and the second object recognition process, for a long-distance region in which the distance from the predetermined base point is greater than the second distance, the first object recognition process including performing the object recognition process using the measurement data, the second object recognition process including performing the object recognition process using the measurement data and the image data; and adjusting, based on data on a traveling environment of a mobile body, respective time periods for which the first object recognition process and the second object recognition process are to be performed, or a ratio between respective ranges in which the first object recognition process and the second object recognition process are to be performed in a measurement range in which the object recognition process is to be performed.

An aspect of the disclosure provides a non-transitory tangible computer readable recording medium containing a computer program. The computer program causes, when executed by a computer, the computer to implement a method. The method includes: performing an object recognition process based on measurement data of a ranging sensor and image data of a camera, the ranging sensor being configured to measure at least distances to reflection points based on reflected waves of applied irradiation waves, the camera being configured to generate the image data on an imaging range, the object recognition process including performing a predetermined first object recognition process for a short-distance region in which a distance from a predetermined base point is equal to or less than a first distance set as a minimum distance that allows for object recognition by the object recognition process based on the image data, performing a predetermined second object recognition process different from the first object recognition process, for a middle-distance region in which the distance from the predetermined base point is greater than the first distance and is equal to or less than a second distance set as an upper limit of a distance that allows for the object recognition by the object recognition process based on the image data, and performing a predetermined third object recognition process different from the first object recognition process and the second object recognition process, for a long-distance region in which the distance from the predetermined base point is greater than the second distance, the first object recognition process including performing the object recognition process using the measurement data, the second object recognition process including performing the object recognition process using the measurement data and the image data; and adjusting, based on data on a traveling environment of a mobile body, respective time periods for which the first object recognition process and the second object recognition process are to be performed, or a ratio between respective ranges in which the first object recognition process and the second object recognition process are to be performed in a measurement range in which the object recognition process is to be performed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
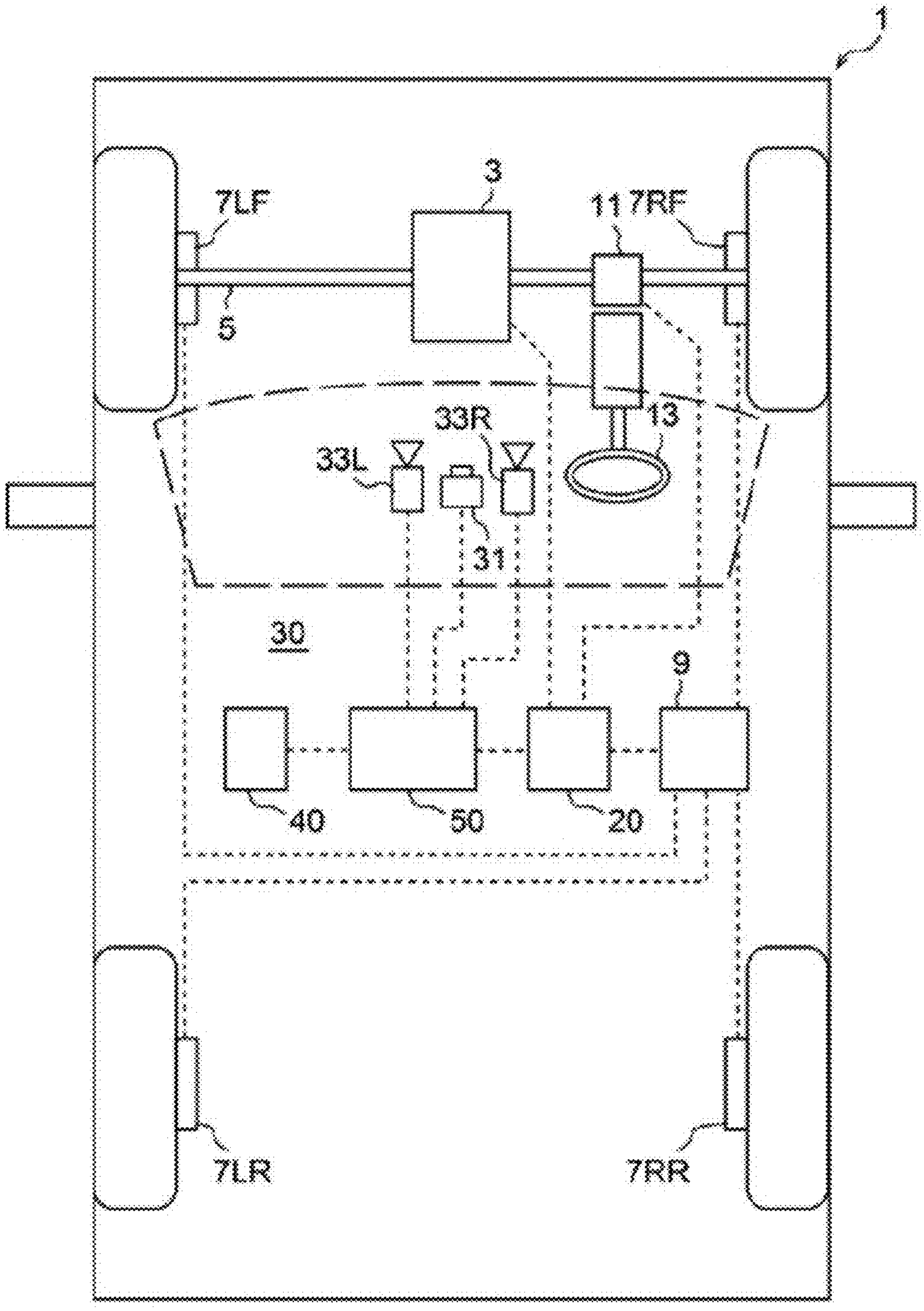
FIG. 1 is a schematic diagram illustrating a configuration example of a vehicle including an object recognition apparatus according to one example embodiment of the disclosure.

An imaging device and a ranging sensor have different characteristics in temporal resolution (temporal resolving power) and spatial resolution (spatial resolving power). For this reason, it is difficult to make the temporal resolution and the spatial resolution of each of the imaging device and the ranging sensor variable for a recognition target distance range. In JP-A Nos. 2005-090974 and 2003-084064 described above, a predetermined recognition range in which a preceding vehicle or a front vehicle exists is set as the recognition target distance range. Allowing for processing making use of the respective characteristics of the imaging device and the ranging sensor in accordance with the distance range from the vehicle makes it possible to increase object recognition accuracy around the vehicle.

It is desirable to provide an object recognition apparatus, an object recognition processing method, and a non-transitory recording medium that make it possible to improve object recognition accuracy by allowing for an object recognition process making use of respective characteristics of an imaging device and a ranging sensor.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

1. Overall Configuration of Object Recognition Apparatus

First, an example of an overall configuration of a vehicle equipped with an object recognition apparatus according to an example embodiment of the disclosure will be described. The vehicle may be an example of a mobile body. The following example embodiments describe an example of the object recognition apparatus including a LiDAR as an example of a ranging sensor.

FIG. 1 is a schematic diagram illustrating a configuration example of a vehicle 1 including an object recognition apparatus 30 according to the example embodiment. The vehicle 1 illustrated in FIG. 1 may be configured as a front-wheel drive vehicle that transmits, to front wheels, a drive torque outputted from a drive source 3 that generates the drive torque for the vehicle 1. The drive source 3 may be an internal combustion engine, such as a gasoline engine or a diesel engine, or a drive motor, or may include both the internal combustion engine and the driving motor.

Note that the vehicle 1 is not limited in combination of driving wheels or driving method. For example, the vehicle 1 may be a rear-wheel drive vehicle, a four-wheel drive vehicle, or an electric vehicle including drive motors corresponding to respective wheels. When the vehicle 1 is an electric vehicle or a hybrid electric vehicle, the vehicle 1 may be equipped with a secondary battery that accumulates electric power to be supplied to the drive motor, and a generator such as a motor or a fuel cell that generates electric power to be charged in the battery.

The vehicle 1 may include, as devices used to control driving of the vehicle 1, the drive source 3, an electric steering device 11, and braking devices 7LF, 7RF, 7LR, and 7RR. Hereinafter, the braking devices 7LF, 7RF, 7LR, and 7RR may be collectively referred to as a "braking device 7" when it is not necessary to distinguish them from one another. The drive source 3 may output a drive torque to be transmitted to a front wheel drive shaft 5 through a transmission and a front-wheel differential mechanism that are not illustrated. Driving of the drive source 3 and the transmission may be controlled by a vehicle processor 20 including one or more electronic control units (ECUs).

The electric steering device 11 may be provided on the front wheel drive shaft 5. The electric steering device 11 may include an electric motor and a gear mechanism that are not illustrated, and may be controlled by the vehicle processor 20 to adjust a steering angle of the left and right front wheels. During manual driving, the vehicle processor 20 may control the electric steering device 11, based on the steering angle of a steering wheel 13 steered by a driver who drives the vehicle 1. Further, during automated driving, the vehicle processor 20 may control the electric steering device 11, based on a target steering angle set in accordance with a planned travel path.

The braking devices 7LF, 7RF, 7LR, and 7RR may apply a braking force to a left-front wheel, a right-front wheel, a left-rear wheel, and a right-rear wheel, respectively. The braking device 7 may be configured as, for example, a hydraulic braking device. Hydraulic pressure to be supplied to each braking device 7 may be controlled by a hydraulic control unit 9 to thereby generate a predetermined braking force. When the vehicle 1 is an electric vehicle or a hybrid electric vehicle, the braking device 7 may be used in combination with regenerative braking that uses the drive motor.

The vehicle processor 20 may include one or more electronic control units that control driving of the drive source 3, the electric steering device 11, and the hydraulic control unit 9. When the vehicle 1 includes a transmission, the vehicle processor 20 may be configured to control driving of the transmission. The vehicle processor 20 may be configured to perform an automated driving control or an emergency braking control for the vehicle 1 by using data on an object recognized by the object recognition apparatus 30.

The object recognition apparatus 30 includes a LiDAR 31, a camera 33, and a processing device 50. The LiDAR 31 and the camera 33 may be installed, for example, at an upper part on a vehicle compartment side of a windshield in a vehicle compartment, or at a front part of a vehicle body, with a measurement direction or an imaging direction facing forward.

In one embodiment, the LiDAR 31 may serve as a "ranging sensor" that measures at least distances to reflection points based on reflected waves of applied irradiation waves. The LiDAR 31 may apply laser light, i.e., optical waves, in multiple directions in front of the vehicle 1, and receive reflected light, i.e., reflected waves, of the laser light. The laser light may be a type of the irradiation wave. The LiDAR 31 may acquire data on positions of the reflection points in a three-dimensional space (hereinafter, also referred to as "point group data") based on the laser light and the reflected light. The point group data of the LiDAR 31 may correspond to measurement data of the ranging sensor.

For example, the LiDAR 31 may be a time-of-flight (ToF) LiDAR that calculates the position of the reflection point in the three-dimensional space based on data on a direction from which the reflected light is received and data on a time period from the application of the laser light to the reception of the reflected light. The LiDAR 31 may calculate the position of the reflection point further based on data on intensity of the reflected light. In another example, the LiDAR 31 may be a frequency modulated continuous wave (FMCW) LiDAR that applies laser light with linearly changed frequency, and calculates the position of the reflection point in the three-dimensional space based on data on a direction from which reflected light is received and data on a phase difference between the frequency of the applied laser light and the frequency of the reflected light.

The LiDAR 31 may be what is called a scanning LiDAR that performs scanning in a horizontal direction or a vertical direction with multiple pieces of laser light arranged in a line along the vertical direction or the horizontal direction. The LiDAR 31 may be a LiDAR of a type that generates reflection point group data by applying laser light over a wide range, imaging reflected light reflected by an object by using a three-dimensional distance image sensor, and analyzing the positions of the reflection points in the three-dimensional space. The LiDAR 31 may be communicably coupled to the processing device 50 by a wired or wireless communication system. The LiDAR 31 may transmit the generated point group data to the processing device 50.

The point group data generated by the LiDAR 31 may be, for example, data on coordinate positions of the respective reflection points on an orthogonal triaxial three-dimensional coordinate system (also referred to as a "LiDAR coordinate system") using the LiDAR 31 itself as an origin. When the LiDAR 31 measures a region in front of the vehicle 1, the LiDAR 31 may be installed with the three axes of the LiDAR coordinate system aligned with a front-rear direction, a vehicle-width direction, and a height direction of the vehicle 1, but the LiDAR 31 may be installed differently. The coordinate positions of the reflection points of the point group data generated by the LiDAR 31 may be converted, by the processing device 50, into coordinate positions on an orthogonal triaxial three-dimensional coordinate system (also referred to as a "vehicle coordinate system") using a predetermined position of the vehicle 1 as an origin and extending along the longitudinal direction, the vehicle width direction, and the height direction of the vehicle 1.

The LiDAR 31 typically has a fixed sum of energies that are applicable to a unit virtual plane of a space where the laser light is to be applied. For this reason, the LiDAR 31 has a characteristic that a spatial resolution decreases proportionally to a distance from a light emitting surface that issues the laser light. On the other hand, it is possible for the LiDAR 31 to extend a measurement distance by limiting an irradiation range where the laser light is to be applied, or increase the spatial resolution by reducing a frame rate, i.e., the frequency of processing per unit time.

Note that the ranging sensor is not limited to the LiDAR 31, and may be a radar sensor such as a millimeter-wave radar.

The camera 33 may be an imaging device including an image sensor, such as a charged-coupled device (CCD) or a complementary metal-oxide-semiconductor (CMOS). In the example embodiment, the vehicle 1 may include a pair of left and right stereo cameras 33LF and 33RF that perform imaging of a region in front of the vehicle 1. The stereo cameras 33LF and 33RF may be communicably coupled to the processing device 50 by a wired or wireless communication system. The stereo cameras 33LF and 33RF may transmit the generated image data to the processing device 50.

In the vehicle 1 illustrated in FIG. 1, the camera 33 may be configured as the pair of left and right stereo cameras 33LF and 33RF, but may be a monocular camera including one imaging camera. The vehicle 1 may include, in addition to the front imaging camera, a camera that performs imaging of a region in the rear of the vehicle 1, or a camera that is provided on a side-view mirror, for example, to perform imaging of a left rear region or a right rear region.

The imaging direction and an angle of view that indicate an imaging range of the camera 33 may be defined by, for example, an orthogonal triaxial three-dimensional coordinate system (also referred to as a "camera coordinate system") using the camera 33 itself as an origin. When the camera 33 includes the stereo cameras 33LF and 33RF, the camera coordinate system may be a three-dimensional coordinate system using a center point between the pair of stereo cameras 33LF and 33RF as the origin. When the camera 33 measures a region in front of the vehicle 1, the camera 33 may be installed with the three axes of the camera coordinate system aligned with the front-rear direction, the vehicle-width direction, and the height direction of the vehicle 1, but the camera 33 may be installed differently. Data on the imaging range of the image data generated by the camera 33 may be converted into data on the vehicle coordinate system by the processing device 50.

The camera 33 typically has a fixed number of captured images (fps: frames per second) per unit time or second. The camera 33 has a characteristic that the camera 33 is not focused and the generated image data thus has a low spatial resolution in a region closer than a focal length. The camera 33 also has a characteristic that, with a peak at the focal length, the spatial resolution on a virtual plane of a space decreases depending on a resolution of the image sensor in a region farther than the focal length. Further, in the case of the stereo cameras 33LF and 33RF, a smallest distance at which the respective pieces of image data generated by the left and right cameras are matchable (stereo-matchable) is defined additionally. The focal length or the above-described smallest distance of the camera 33 may be a first distance L1, and may serve as a minimum distance that allows for object recognition by an object recognition process based on the image data.

Figure 2:
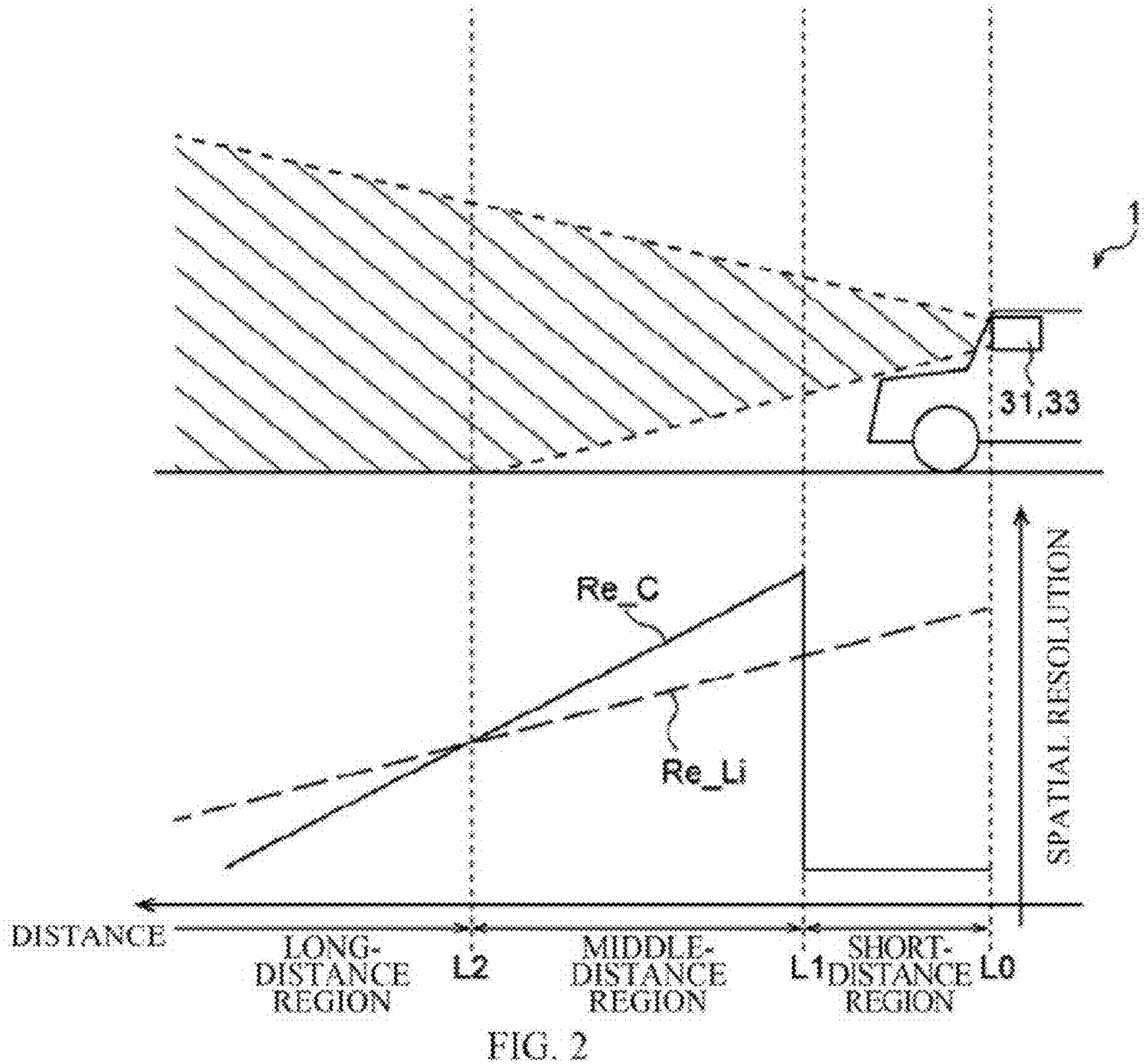
FIG. 2 is an explanatory diagram illustrating spatial resolutions of a LiDAR and a camera.
Figure 3:
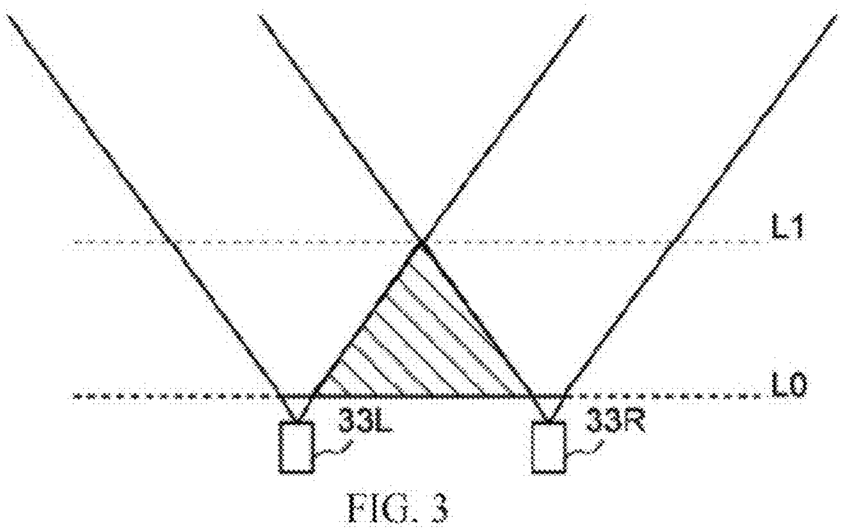
FIG. 3 is an explanatory diagram illustrating a smallest distance at which stereo matching is possible by a stereo camera.

FIG. 2 is a diagram illustrating the spatial resolutions of the LiDAR 31 and the camera 33. In the illustrated example, the LiDAR 31 and the camera 33 may be installed at the upper part on the vehicle compartment side of the windshield of the vehicle 1. A spatial resolution Re_C of the image data generated by the camera 33 is low in a region (hereinafter, also referred to as a "short-distance region") from an installation position L0 of the camera 33 to the first distance L1 defined as, for example, the focal length or the smallest distance at which stereo matching is possible of the camera 33. The installation position may also be referred to as a "base point". As illustrated in FIG. 3, when the camera 33 includes the stereo cameras 33LF and 33RF, the first distance L1 is defined by the smallest distance at which the respective pieces of image data generated by the stereo cameras 33LF and 33RF are stereo-matchable. The spatial resolution Re_C of the image data generated by the camera 33 peaks at the first distance L1 and decreases proportionally as getting farther from the first distance L1.

On the other hand, a spatial resolution Re_Li of the LiDAR 31 decreases proportionally as getting farther from the installation position (base point) L0 of the LiDAR 31. In the illustrated example, the spatial resolution Re_Li of the LiDAR 31 is higher than the spatial resolution Re_C of the camera 33 in the short-distance region where the distance from the installation position (base point) L0 of the LiDAR 31 and the camera 33 is equal to or less than the first distance L1. The spatial resolution Re_Li of the LiDAR 31 and the spatial resolution Re_C of the camera 33 intersect each other at a second distance L2 farther than the first distance L1. In other words, in a region (hereinafter also referred to as "middle-distance region") where the distance from the installation position (base point) L0 of the LiDAR 31 and the camera 33 is greater than the first distance L1 and up to the second distance L2, the spatial resolution Re_C of the camera 33 is higher than the spatial resolution Re_Li of the LiDAR 31. Further, in a region (hereinafter also referred to as "long-distance region") where the distance from the installation position (base point) L0 of the LiDAR 31 and the camera 33 is greater than the second distance L2, the spatial resolution Re_Li of the LiDAR 31 is higher than the spatial resolution Re_C of the camera 33 again.

In any embodiment of the disclosure, the object recognition apparatus 30 is configured to perform highly accurate object recognition in each of the short-distance region, the middle-distance region, and the long-distance region, based on the characteristics of the respective spatial resolutions Re_Li and Re_C of the LiDAR 31 and the camera 33 illustrated in FIG. 2.

Note that, in the example embodiment, the first distance L1 described above may be a boundary between the short-distance region and the middle-distance region, and the second distance L2 described above may be a boundary between the middle-distance region and the long-distance region, but each of the first distance L1 and the second distance L2 may not match the boundary. For example, the boundary between the middle-distance region and the long-distance region may be set based on accuracy of distance measurement by parallax detection by the stereo cameras 33LF and 33RF. In another example, the boundary between the middle-distance region and the long-distance region may be set based on comparison between: a minimum detection size at any distance, based on a minimum scan angle between irradiation points of the laser light, of the LiDAR 31; and a detection size corresponding to one pixel at any distance of the camera 33. In addition, the boundary between the regions may be gradually changed in a gradation or may be overlapped.

The processing device 50 may implement an apparatus that recognizes an object when a processor such as one or more central processing units (CPUs) or one or more graphics processing units (GPUs) executes a computer program. The computer program may be a computer program that causes the processor to execute a later-described operation to be executed by the processing device 50. The computer program to be executed by the processor may be recorded in a recording medium serving as a storage (memory) provided in the processing device 50. Alternatively, the computer program to be executed by the processor may be recorded in a recording medium built in the processing device 50 or any recording medium externally attachable to the processing device 50.

The recording medium that records the computer program may include: a magnetic medium such as a hard disk, a floppy disk, or a magnetic tape; an optical recording medium such as a compact disk read-only memory (CD-ROM), a digital versatile disk (DVD), or Blu-ray (registered trademark); a magneto-optical medium such as a floptical disk; a storage element such as a random-access memory (RAM) or a read-only memory (ROM); a flash memory such as a universal serial bus (USB) memory or a solid state drive (SSD); or any other medium that is able to store programs.

The processing device 50 may be coupled to the LiDAR 31, the camera 33, the vehicle processor 20, and a notification device 40 via a dedicated line or via a communication system such as a controller area network (CAN) or a local internet (LIN). The notification device 40 may notify an occupant of various pieces of information by, for example, displaying an image or outputting sound, based on a drive signal generated by the processing device 50. The notification device 40 may include, for example, a display provided on an instrument panel and a speaker provided in the vehicle 1. The display may be a display of a navigation system, or a head-up display (HUD) that displays an image on the windshield.

2. Processing Device

Next, the processing device 50 of the object recognition apparatus 30 according to the example embodiment will be described in detail.

2-1. Configuration Example

Figure 4:
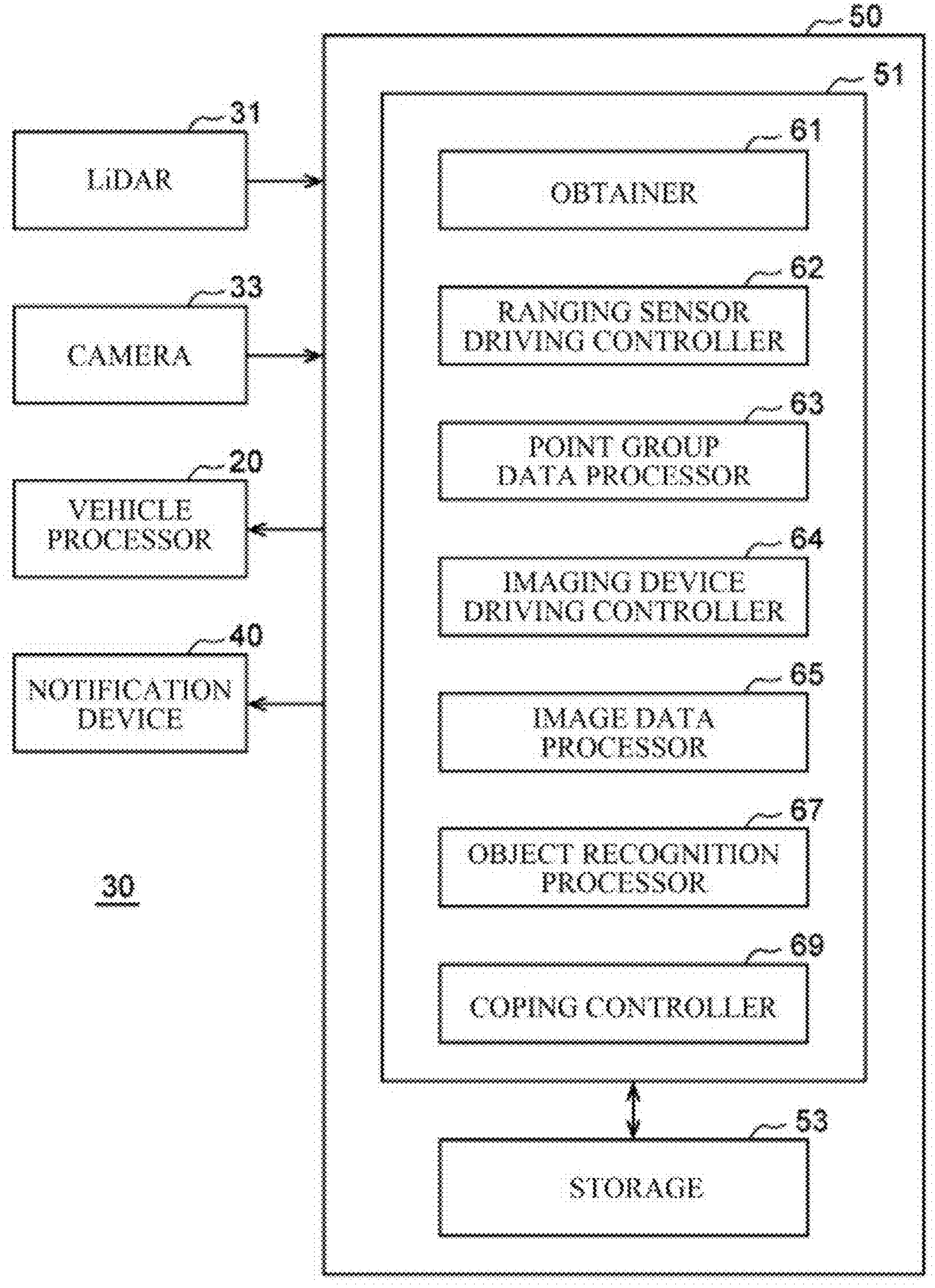
FIG. 4 is a block diagram illustrating a configuration example of the object recognition apparatus according to one example embodiment.

FIG. 4 is a block diagram illustrating a configuration example of the processing device 50.

The processing device 50 may include a processor 51 and a storage 53. The processor 51 may include one or more processors. Part or all of the processor 51 may include updatable software such as firmware, or may be, for example, a program module executed by a command from, for example, a CPU. Note that the processing device 50 may be configured as a single device, or may include multiple devices communicably coupled to each other.

The storage 53 may include one or more storage elements (memories) communicably coupled to the processor 51. Examples of the one or more memories may include a random-access memory (RAM) and a read-only memory (ROM). Note that the storage 53 is not particularly limited in number or type. The storage 53 may store data such as a computer program to be executed by the processor 51, various parameters to be used for a calculation process, detection data, and a calculation result. A part of the storage 53 may serve as a work area of the processor 51.

In addition, the processing device 50 may include one or more communication interfaces that are not illustrated and configured to transmit and receive data to and from the LiDAR 31, the camera 33, the vehicle processor 20, and the notification device 40.

2-2. Configuration of Processor

The processor 51 of the processing device 50 performs the object recognition process based on the point group data transmitted from the LiDAR 31 and the image data transmitted from the camera 33. In a technique of the disclosure, the processor 51 performs the object recognition process differently for each of the short-distance region, the middle-distance region, and the long-distance region corresponding to the distance from the installation position (base point) L0 of the LiDAR 31 and the camera 33.

As illustrated in FIG. 4, the processor 51 of the processing device 50 may include an obtainer 61, a ranging sensor driving controller 62, a point group data processor 63, an imaging device driving controller 64, an image data processor 65, an object recognition processor 67, and a coping controller 69. The obtainer 61, the ranging sensor driving controller 62, the point group data processor 63, the imaging device driving controller 64, the image data processor 65, the object recognition processor 67, and the coping controller 69 may be implemented by execution of a computer program by the one or more processors. Note that a part or all of the obtainer 61, the ranging sensor driving controller 62, the point group data processor 63, the imaging device driving controller 64, the image data processor 65, the object recognition processor 67, and the coping controller 69 may be configured by hardware such as an analog circuit.

2-2-1. Obtainer

The obtainer 61 may acquire the point group data transmitted from the LiDAR 31 in a predetermined cycle and the image data transmitted from the camera 33 in a predetermined cycle. The point group data of the LiDAR 31 may include data on the coordinate positions of the respective reflection points on the LiDAR coordinate system. The image data of the camera 33 may be image data on the imaging range generated by the image sensor.

2-2-2. Ranging Sensor Driving Controller

The ranging sensor driving controller 62 controls driving of the ranging sensor. In the example embodiment, the ranging sensor driving controller 62 may control application of the laser light by the LiDAR 31. For example, the ranging sensor driving controller 62 may control an irradiation energy and an irradiation position of the laser light to be applied from the LiDAR 31. The irradiation energy and the irradiation position of the laser light may change every predetermined time period or randomly.

In the example embodiment, the ranging sensor driving controller 62 may set the minimum scan angle between the irradiation points and the irradiation energy of the laser light, to make the minimum detection size between the irradiation points on the virtual unit plane less than a predetermined value in a distance range of each of the short-distance region, the middle-distance region, and the long-distance region.

2-2-3. Point Group Data Processor

The point group data processor 63 may perform predetermined data processing based on the point group data acquired from the LiDAR 31. In the example embodiment, the point group data processor 63 may calculate the distance from a predetermined base point to the reflection point, for each of the reflection points included in the acquired point group data. The point group data processor 63 may also extract clusters that are each a group of reflection points whose distances between the reflection points are within a predetermined distance, i.e., perform clustering. Further, the point group data processor 63 may calculate, in three-dimensional maps (hereinafter, also referred to as "frames") including the clusters extracted from the respective pieces of point group data acquired in time series, a movement vector of the center of the cluster between the frames. The center of the cluster may be, for example, a coordinate position having the minimum sum of the distances from the reflection points included in the extracted cluster, but the method of calculating the center of the cluster is not particularly limited. The movement vector may indicate a movement speed and a movement direction of the object configuring the cluster.

Figure 5:
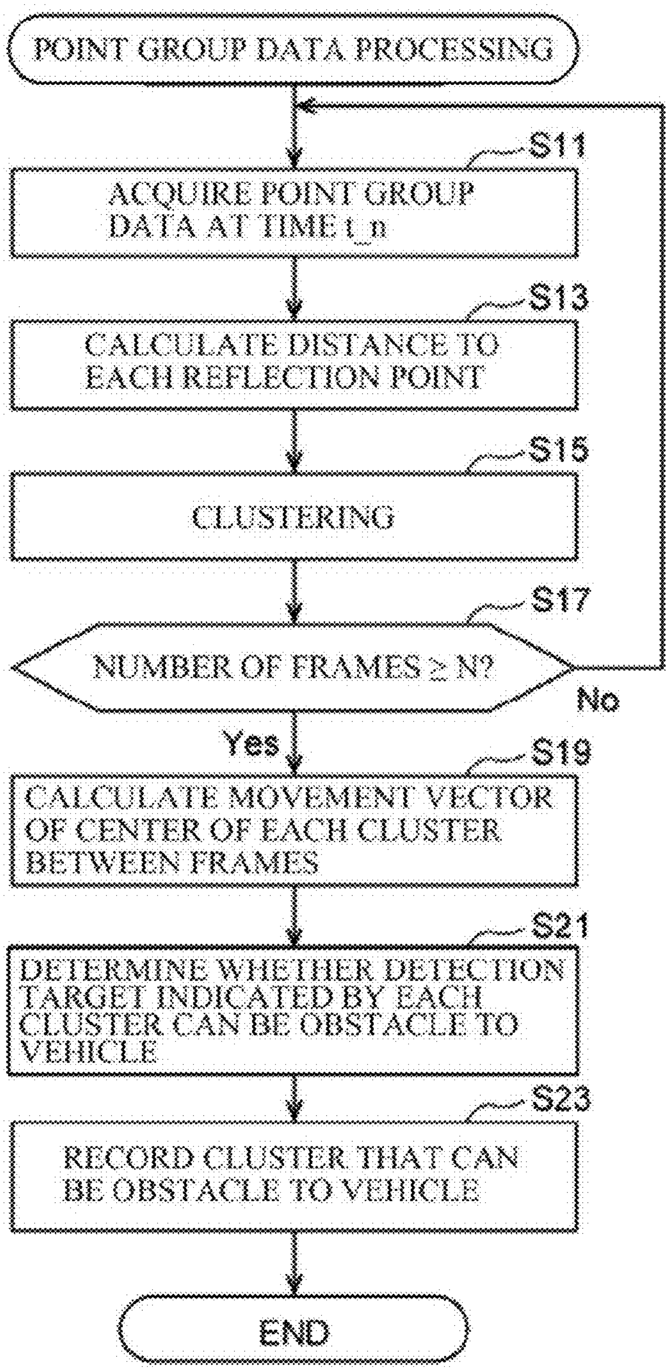
FIG. 5 is a flowchart illustrating a routine of point group data processing performed by a point group data processor, of an object recognition process according to one example embodiment.

FIG. 5 is a flowchart illustrating a routine of point group data processing performed by the point group data processor 63.

The point group data processor 63 may acquire the point group data at a time t_n transmitted from the LiDAR 31 (step S11). Thereafter, the point group data processor 63 may calculate the distance to each of the reflection points included in the point group data (step S13). For example, the point group data processor 63 may convert the coordinate position on the LiDAR coordinate system to the coordinate position on the vehicle coordinate system, for each of the reflection points, and calculate the distance from the origin of the vehicle coordinate system to each reflection point.

The vehicle coordinate system may be an orthogonal triaxial three-dimensional coordinate system using the base point (L0) of distance measurement in the object recognition process as the origin and the front-rear direction, the vehicle-width direction, and the vehicle-height direction of the vehicle 1 as the three axes. The example embodiment describes an example in which a center point in the vehicle-width direction at the installation position of the LiDAR 31 and the camera 33, in the front-rear direction of the vehicle 1, is used as the base point (L0), and the distance to each reflection point is calculated. However, the position of the base point may be set at any position, such as the front part of the vehicle 1.

Note that an appropriate method may be used as the method of calculating the distance to each reflection point, in accordance with a type or specifications of the LiDAR 31.

Thereafter, the point group data processor 63 may extract the clusters that are each a group of reflection points whose distances between the reflection points are within the predetermined distance, as clustering (step S15). For example, the point group data processor 63 may extract the cluster by grouping, into the same group, the reflection points having a relationship in which distances between the reflection points are within a preset threshold of the processing. The point group data processor 63 may generate data on the frame (the three-dimensional map) including data on the cluster in the three-dimensional space by the clustering process.

Euclidean distance may be used, for example, as the distance between the reflection points, but another distance may be used. The clustering process is not limited to the above example, and any method may be used.

Thereafter, the point group data processor 63 may determine whether the number of generated frames has become equal to or greater than a predetermined threshold N (step S17). The predetermined threshold N may be set in advance to any value of two or more, as the number of frames in time series to be used to calculate the movement vector (the movement speed and the movement direction) of the object indicated by each of the clusters.

If it is not determined that the number of frames is equal to or greater than the predetermined threshold N (S17/No), the point group data processor 63 may cause the process to return to step S11, and repeat the process of extracting the cluster from the point group data at a time t_n+1 to generate the frame.

In contrast, if it is determined that the number of frames is equal to or greater than the predetermined threshold N (S17/Yes), the point group data processor 63 may calculate the movement vector of the center of the cluster of the reflection points based on the same detection target included in each frame (step S19). For example, the point group data processor 63 may calculate the center of the cluster based on the coordinate positions of the multiple reflection points included in the cluster, for each of the clusters included in each frame. The point group data processor 63 may also identify the cluster of the reflection points based on the same detection target, among the clusters included in each frame, based on the position and the shape of each of the clusters included in the frames in time series, or data on the movement vectors of the clusters identified up to the previous calculation cycle.

Further, the point group data processor 63 may calculate the movement vector of the center of the cluster of the reflection points based on the same detection target on the vehicle coordinate system. The movement vector may have a direction indicating the movement direction of the detection target. The movement vector may have a magnitude indicating a distance that the detection target has moved in a time period corresponding to a difference between acquisition times of the reflection points of the cluster included in the multiple frames. In other words, the magnitude of the movement vector may indicate the movement speed of the detection target. The point group data processor 63 may record data on the positions, the movement directions, and the movement speeds of the clusters obtained by the above point group data processing, in the storage 53.

Thereafter, the point group data processor 63 may determine whether each of the clusters can be an obstacle to the vehicle 1 (step S21). For example, the point group data processor 63 may determine that the cluster can be an obstacle to the vehicle 1 when the movement direction of the cluster intersects the planned travel path of the vehicle 1. In addition, the point group data processor 63 may determine that the cluster can be an obstacle to the vehicle 1 when the cluster exists within a lane on which the vehicle 1 is traveling. The planned travel path or the lane of the vehicle 1 may be grasped based on, for example, data on a travel division line detected by the image data processor 65.

Thereafter, for the cluster determined as a cluster that can be an obstacle to the vehicle 1, the point group data processor 63 may record data indicating that in the data recorded in the storage 53 (step S23). Thus, in the storage 53, the data on the clusters extracted from the point group data of the LiDAR 31 may be recorded together with the data on whether each of the clusters can be an obstacle to the vehicle 1.

2-2-4. Imaging Device Driving Controller

The imaging device driving controller 64 may control driving of the camera 33. In the example embodiment, the imaging device driving controller 64 may generate, every predetermined time period, the image data on the imaging range captured by the camera 33.

2-2-5. Image Data Processor

The image data processor 65 may perform predetermined data processing based on the image data acquired from the camera 33. In the example embodiment, the image data processor 65 may detect the travel division line, such as a lane line, based on the acquired image data.

Figure 6:
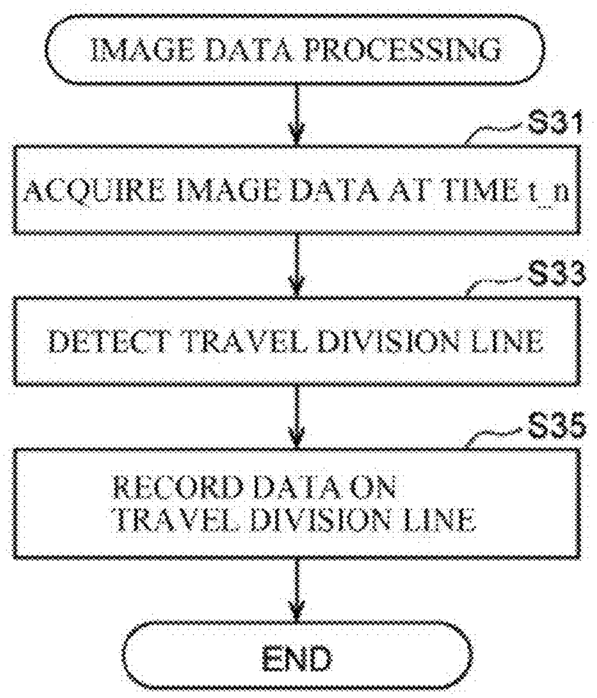
FIG. 6 is a flowchart illustrating a routine of image data processing performed by an image data processor, of the object recognition process according to one example embodiment.

FIG. 6 is a flowchart illustrating a routine of image data processing performed by the image data processor 65.

The image data processor 65 may acquire the image data at the time t_n transmitted from the camera 33 (step S31). Thereafter, the image data processor 65 may detect the travel division line based on the image data (step S33). For example, the image data processor 65 may detect the traveling partition line by performing a process, i.e., an edge detection process, of detecting an edge where an amount of change in luminance in the image data exceeds a predetermined threshold, and a process, i.e., a feature point matching process, of identifying the travel division line based on a pattern of the edge. However, the method of detecting the travel division line based on the image data is not particularly limited.

In addition, the image data processor 65 may determine a relative position of the travel division line with respect to the vehicle 1. When the camera 33 includes the stereo cameras 33LF and 33RF, the image data processor 65 may determine the position of the travel division line on the vehicle coordinate system, based on parallax data of the respective pieces of image data generated by the left and right stereo cameras 33LF and 33RF. When the camera 33 is a monocular camera, the image data processor 65 may determine the position of the travel division line on the vehicle coordinate system, based on a change in the travel division line in multiple pieces of image data acquired in time series.

Thereafter, the image data processor 65 may record data on the detected travel division line in the storage 53 (step S35).

2-2-6. Object Recognition Processor

The object recognition processor 67 performs the object recognition process by different methods for different regions, i.e., the short-distance region, the middle-distance region, and the long-distance region. Described below are the different object recognition processes, including the first object recognition process to be performed for the short-distance region, the second object recognition process to be performed for the middle-distance region, and the third object recognition process to be performed for the long-distance region.

First Object Recognition Process

In the first object recognition process for the short-distance region, the object recognition processor 67 performs a process of recognizing an object by using the point group data acquired from the LiDAR 31. For example, the object recognition processor 67 may recognize the object based on a cluster (a short-distance cluster) in the short-distance region, among the clusters extracted by the point group data processor 63.

The short-distance region is a region in which the spatial resolution of the LiDAR 31 is higher than the spatial resolution of the camera 33 (see FIG. 2). In the short-distance region, image data that allows for object recognition by the object recognition process is not obtainable, and the stereo cameras 33LF and 33RF are not able to perform distance measurement based on the image data in a region in which stereo matching is not possible. In addition, the short-distance region is a region that is close to the vehicle 1 and in which contact avoidance, for example, is to be performed highly urgently when an object exists. For this reason, in the short-distance region, the object recognition processor 67 may recognize an object by using the point group data of the LiDAR 31 having a higher spatial resolution.

For the short-distance region having a small distance from the vehicle 1, the object recognition processor 67 may estimate a type of the object and a distance to the object but may not estimate, for example, the movement speed or a size of the object. This allows the object recognition processor 67 to quickly detect the object, by reducing load or time for the object recognition process for the short-distance region.

Figure 7:
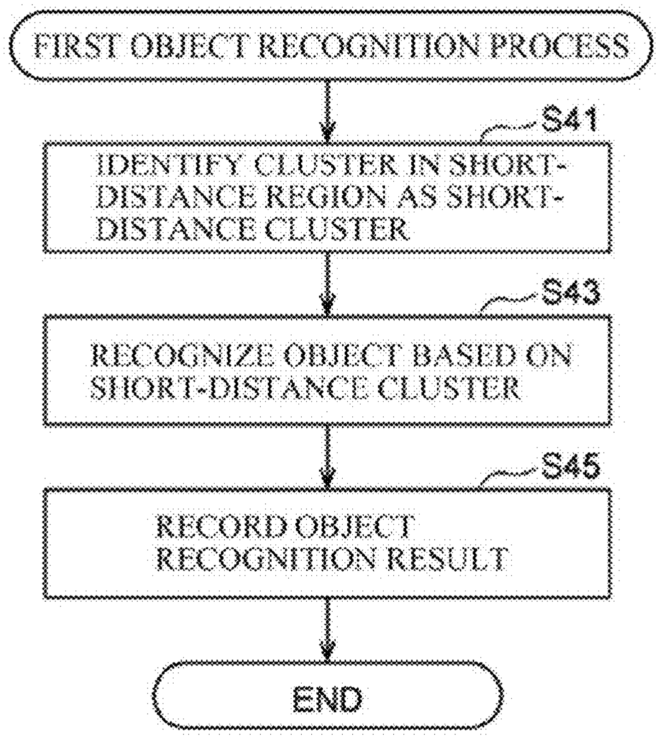
FIG. 7 is a flowchart illustrating a routine of a first object recognition process for a short-distance region performed by an object recognition processor, of the object recognition process according to one example embodiment.

FIG. 7 is a flowchart illustrating the first object recognition process performed by the object recognition processor 67.

The object recognition processor 67 may identify the short-distance cluster that exists in the short-distance region, among the clusters recorded as clusters that can be an obstacle to the vehicle 1 by the point group data processor 63 in step S23 described above (step S41).

For example, the object recognition processor 67 may identify, as the short-distance cluster, a cluster whose distance from the base point L0 of the vehicle coordinate system to the center of the cluster is less than the first distance L1 set as the minimum distance that allows for object recognition by the object recognition process based on the image data. The object recognition processor 67 may set, as the short-distance cluster, a cluster whose distance to the reflection point having the smallest distance from the base point L0 of the vehicle coordinate system, among the reflection points included in the cluster, is less than the first distance L1. Alternatively, the object recognition processor 67 may set, as the short-distance cluster, a cluster whose distance to the reflection point having the largest distance from the base point L0 of the vehicle coordinate system, among the reflection points included in the cluster, is less than the first distance L1.

Thereafter, the object recognition processor 67 may recognize the detection target object based on the identified short-distance cluster (step S43). For example, the object recognition processor 67 may perform a pattern matching process using the short-distance cluster to identify the type of the detection target object.

Thereafter, the object recognition processor 67 may record data on an object recognition result in the storage 53 (step S45). For example, the object recognition processor 67 may record, for each short-distance cluster, data on the type of the recognized object, an existence position or direction of the object, the distance to the object, and the movement direction and the movement speed of the object. The existence position of the object may be, for example, the direction in which the center of the corresponding short-distance cluster is positioned with respect to the origin (the base point L0) of the vehicle coordinate system. The distance to the object may be the distance to the reflection point having the smallest distance from the origin of the vehicle coordinate system, among the reflection points included in the short-distance cluster. The movement direction and the movement speed of the object may be data on the movement vector calculated by the point group data processor 63 in step S19 described above.

Second Object Recognition Process

In the second object recognition process for the middle-distance region, the object recognition processor 67 performs the object recognition process using the point group data of the LiDAR 31 and the image data of the camera 33. In the example embodiment, the object recognition processor 67 may recognize an object by setting, in the image data, a determination region including a cluster in the middle-distance region (a middle-distance cluster) among the clusters extracted by the point group data processor 63, and performing an edge detection process and a feature point matching process based on image data on the determination region.

The middle-distance region is a region in which both the spatial resolution of the LiDAR 31 and the spatial resolution of the camera 33 are relatively high (see FIG. 2). However, because the spatial resolution of the camera 33 is higher than the spatial resolution of the LiDAR 31, the object recognition processor 67 performs the object recognition process using the image data. Performing the object recognition process using the image data for the whole image data on the imaging range results in increased load of calculation by the processor and longer processing time. The middle-distance region is a region that is closer to the vehicle 1 than the long-distance region, among regions in which the object is recognizable by the camera 33, and relatively short time is thus desired to be taken for the object recognition process.

For this reason, in the example embodiment, the object recognition processor 67 may primarily identify the detection target existing in the middle-distance region based on the point group data of the LiDAR 31, and perform the object recognition process using the image data by narrowing down the region, i.e., the determination region, in which the detection target exists. This allows the object recognition processor 67 to reduce the load or the time for the object recognition process while performing the object recognition process in the middle-distance region with high accuracy.

Figure 8:
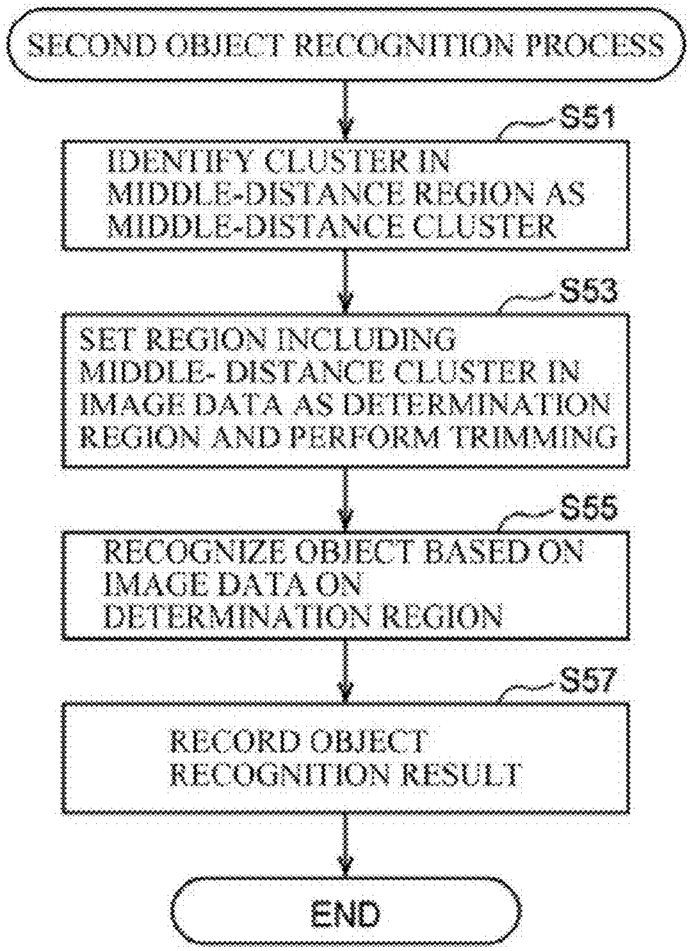
FIG. 8 is a flowchart illustrating a routine of a second object recognition process for a middle-distance region performed by the object recognition processor, of the object recognition process according to one example embodiment.

FIG. 8 is a flowchart illustrating the second object recognition process performed by the object recognition processor 67.

The object recognition processor 67 may identify a middle-distance cluster that exists in the middle-distance region, among the clusters recorded as clusters that can be an obstacle to the vehicle 1 by the point group data processor 63 in step S23 described above (step S51). The middle-distance cluster may be identified in a manner similar to the method of identifying the short-distance cluster described in step S41 described above.

Thereafter, the object recognition processor 67 may set a predetermined region including the coordinate position of the middle-distance cluster in the image data as the determination region (step S53). For example, the object recognition processor 67 may set a minimum rectangular region that includes all the reflection points included in each middle-distance cluster as the determination region. The rectangular region to be set may be a region that extends vertically and horizontally parallel to two vertical and horizontal sides of the image data generated by the camera 33. Alternatively, the object recognition processor 67 may set the determination region by adding a preset margin to the minimum rectangular region including all the reflection points included in each middle-distance cluster. The object recognition processor 67 may trim the image data in accordance with the determination region set for each middle-distance cluster.

Note that the determination region to be set is not limited to the rectangular region set to include the reflection point group of the middle-distance cluster, and may be a circular or elliptical region or a region with any other appropriate shape.

Thereafter, the object recognition processor 67 may perform the object recognition process using the trimmed image data on the determination region (step S55). For example, the object recognition processor 67 may perform an edge detection process and a feature point matching process on the image data on each determination region to identify the type of the detection target object. In addition, the object recognition processor 67 may determine the distance to the detection target object and the existence position (direction) of the object, based on the image data on the determination region. When the camera 33 includes the stereo cameras 33LF and 33RF, the object recognition processor 67 may determine the distance to the object based on the parallax data of the respective pieces of image data generated by the left and right stereo cameras 33LF and 33RF. When the camera 33 is a monocular camera, the object recognition processor 67 may determine the distance to the object based on a change in the same detection target in multiple pieces of image data acquired in time series. The object recognition processor 67 may determine the existence position (direction) of the object based on a position or a range of the detection target in the image data.

In addition, the object recognition processor 67 may determine the movement direction and the movement speed of the detection target object, based on a change in the distance to the detection target object and the existence position (direction) of the object determined from the pieces of image data in time series. The object recognition processor 67 may calculate a relative movement direction and a relative movement speed of the detection target object with respect to the vehicle 1, from the change in the distance and the existence position of the detection target object on the vehicle coordinate system, and calculate the movement speed and the movement direction of the detection target object, based on the relative speed and the relative movement direction of the object and a speed and a movement direction of the vehicle 1.

Thereafter, the object recognition processor 67 may record data on the object recognition result in the storage 53 (step S57). For example, the object recognition processor 67 may record data on the type of the recognized object, the existence position (direction) of the object, the distance to the object, and the movement direction and the movement speed of the object, for each of the detection targets corresponding to the middle-distance clusters.

Third Object Recognition Process

In the third object recognition process for the long-distance region, the object recognition processor 67 performs the object recognition process using the point group data of the LiDAR 31 and the image data of the camera 33 in a manner similar to that in the second object recognition process for the middle-distance region. In the long-distance region, however, the spatial resolution of the LiDAR 31 and the spatial resolution of the camera 33 are lower than in the middle-distance region, and the spatial resolution of the camera 33 is lower than the spatial resolution of the LiDAR 31 (see FIG. 2).

Hence, in the long-distance region, super-resolution processing is performed on the image data to suppress a decrease in accuracy of the object recognition process based on the image data. The long-distance region is a region that is farthest from the vehicle 1 among regions for which the object recognition process is to be performed, and thus allows more time to be spent on the object recognition process. This allows the object recognition processor 67 to perform the object recognition process in the long-distance region with high accuracy.

Figure 9:
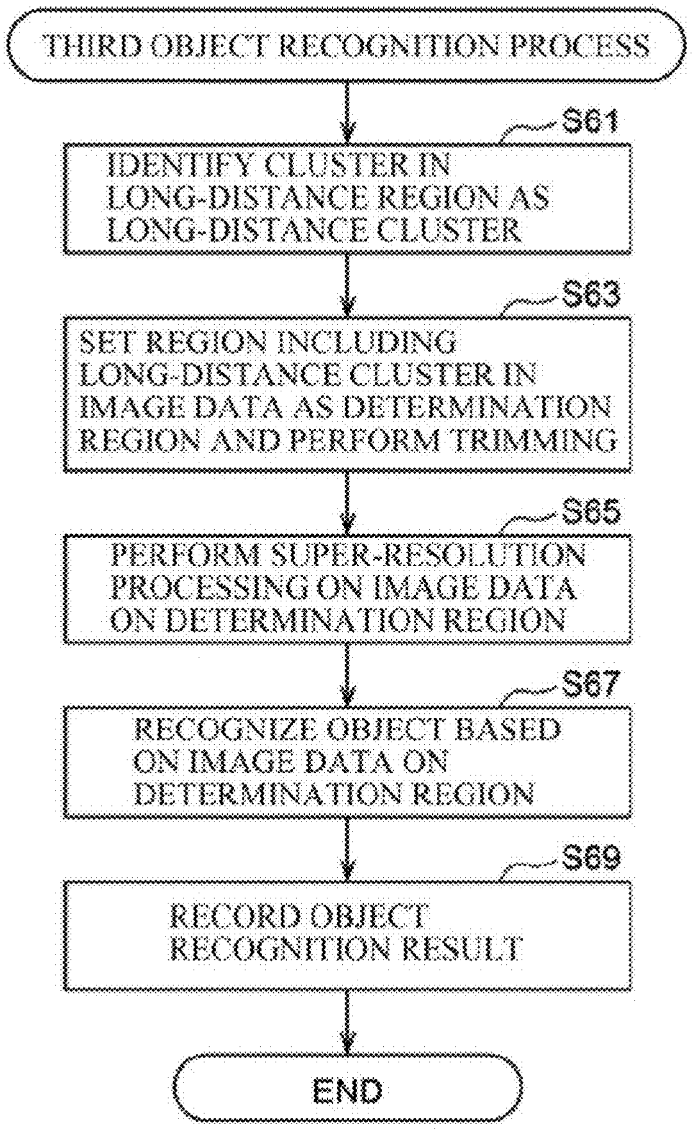
FIG. 9 is a flowchart illustrating a routine of a third object recognition process for a long-distance region performed by the object recognition processor, of the object recognition process according to one example embodiment.

FIG. 9 is a flowchart illustrating the third object recognition process performed by the object recognition processor 67.

The object recognition processor 67 may identify a long-distance cluster that exists in the long-distance region, among the clusters recorded as clusters that can be an obstacle to the vehicle 1 by the point group data processor 63 in step S23 described above (step S61). The long-distance cluster may be identified in a manner similar to the method of identifying the short-distance cluster described in step S41 described above.

Thereafter, the object recognition processor 67 may set a predetermined region including the coordinate position of the long-distance cluster in the image data as a determination region (step S63). The object recognition processor 67 may set the determination region by a procedure similar to that in step S53 of the second object recognition process, and trim the image data in accordance with the determination region.

Note that the processes of identifying the long-distance cluster (step S61) and setting the determination region (step S63) for the long-distance region may be performed in the same steps as the processes of identifying the middle-distance cluster (step S51) and setting the determination region (step S53) for the middle-distance region. For example, the object recognition processor 67 may identify the clusters that exist in the middle-distance region and the long-distance region, and thereafter identify the cluster that exists in the long-distance region, among the clusters, as the long-distance cluster.

Thereafter, the object recognition processor 67 may perform the super-resolution processing on the trimmed image data on the determination region (step S65). When the camera 33 includes the stereo cameras 33LF and 33RF, the object recognition processor 67 may align the respective pieces of image data on the determination region generated by the stereo cameras 33LF and 33RF, to restore the image data as a high-resolution image. When the camera 33 is a monocular camera, the object recognition processor 67 may reconstruct pixel values of the image data on the determination region to emphasize the edge, for example, to restore the image data as a high-resolution image.

Thereafter, the object recognition processor 67 may perform the object recognition process using the high-resolution image data that has been subjected to the super-resolution processing (step S67). The object recognition processor 67 may perform the object recognition process by a procedure similar to that in step S55 of the second object recognition process. Thereafter, the object recognition processor 67 may record data on the object recognition result in the storage 53 (step S69). For example, the object recognition processor 67 may record data on the type of the recognized object, the existence position (direction) of the object, the distance to the object, and the movement direction and the movement speed of the object, for each of the detection targets corresponding to the long-distance clusters.

In other words, in the long-distance region, the object recognition processor 67 performs the super-resolution processing on the image data of the camera 33 and thereafter performs the object recognition process based on the image data. This makes it possible to improve the accuracy of the object recognition process even in a region in which the spatial resolution of the LiDAR 31 and the spatial resolution of the camera 33 decrease.

Note that the object recognition processor 67 may perform a labeling process for an object that has been recognized once in the object recognition process for each of the short-distance region, the middle-distance region, and the long-distance region, and perform a process of tracing the object by using the LiDAR 31 or the camera 33 from then on. The labeling process may be a process of associating data on the object with recognized data. The object recognition processor 67 may thus omit the process of estimating, for example, the type and the size of the object. This makes it possible to reduce the load of the calculation process by the processing device 50.

2-2-7. Coping Controller

The coping controller 69 may perform a predetermined control to cope with the recognized object, based on the result of the object recognition process performed by the object recognition processor 67. . . . For example, the coping controller 69 may transmit data on the object recognition result to the vehicle processor 20 for avoidance of contacting or approaching the recognized object. The data on the object recognition result may include data on one or more of the type, the position, the movement speed, and the movement direction of the object recorded in the storage 53. The vehicle processor 20 may perform the emergency braking control or an automatic steering control to avoid contacting or approaching the object.

In another example, the coping controller 69 may drive the notification device 40 to notify the driver of the existence of the object for avoidance of contacting or approaching the recognized object. For example, the coping controller 69 may notify the driver of, for example, the type or the position of the object, or advice for a driving operation to avoid contacting or approaching, by one or both of sound and display.

3. Object Recognition Processing Method

Next, an object recognition processing method performed by the processing device 50 of the object recognition apparatus 30 according to the example embodiment will be described.

Figure 10:
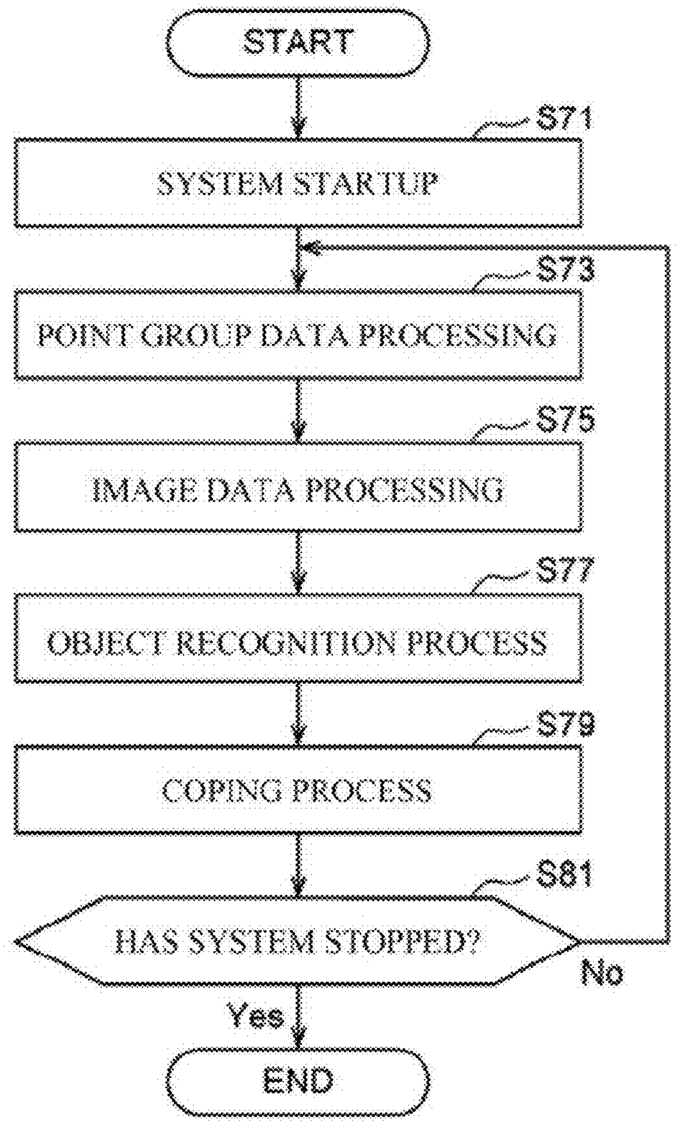
FIG. 10 is a flowchart illustrating an object recognition processing method performed by the object recognition apparatus according to one example embodiment.

FIG. 10 is a flowchart illustrating the object recognition processing method. The flowchart described below may be executed at all times while a system of the vehicle 1 is in operation, or may be executed while an object recognition system is in operation.

When the processor 51 of the processing device 50 detects a startup of the system (step S71), the point group data processor 63 may perform the point group data processing illustrated in FIG. 5, based on the point group data measured by the LiDAR 31 (step S73). In addition, the image data processor 65 may perform the image data processing illustrated in FIG. 6, based on the image data generated by the camera 33 (step S75).

Thereafter, the object recognition processor 67 may perform the first object recognition process illustrated in FIG. 7, the second object recognition process illustrated in FIG. 8, and the third object recognition process illustrated in FIG. 9 for the short-distance region, the middle-distance region, and the long-distance region, respectively (step S77). As described above, the short-distance region for which the first object recognition process is performed is a region with low accuracy of object recognition or distance measurement based on the image data of the camera 33. For this reason, the object recognition process is performed based on the point group data of the LiDAR 31 having a higher spatial resolution for the short-distance region.

The middle-distance region for which the second object recognition process is performed is a region in which both the spatial resolution of the LiDAR 31 and the spatial resolution of the camera 33 are high. For this reason, for the middle-distance region, the cluster (middle-distance cluster) that can be an obstacle to the vehicle 1 is primarily detected based on the point group data of the LiDAR 31, and the object is analyzed based on the image data on the determination region including the middle-distance cluster and set in the image data of the camera 33.

The long-distance region for which the third object recognition process is performed is a region in which both the spatial resolution of the LiDAR 31 and the spatial resolution of the camera 33 decrease. For this reason, for the long-distance region, the cluster (long-distance cluster) that can be an obstacle to the vehicle 1 is primarily detected based on the point group data of the LiDAR 31, and the object is analyzed based on the image data on the determination region including the long-distance cluster and set in the image data of the camera 33. In the third object recognition process, the resolution of the image data is increased by performing the super-resolution processing on the image data.

Consequently, the object recognition process that makes use of the characteristics of the LiDAR 31 and the camera 33 is performed in each of at least the middle-distance region and the long-distance region, which makes it possible to increase the accuracy of the result of the object recognition process. In addition, the object recognition process based on the point group data of the LiDAR 31 is performed in the short-distance region, which makes it possible to complement object recognition in the region in which the accuracy of the object recognition by the camera 33 decreases.

Thereafter, the coping controller 69 may perform one or both of a notification process for avoiding contacting or approaching the object and a process of transmitting the data on the object recognition result to the vehicle processor 20, based on the result of the object recognition process (step S79).

Thereafter, the processor 51 may determine whether the system has stopped (step S81). If it is not determined that the system has stopped (S81/No), the processor 51 may cause the process to return to step S73 and repeat the object recognition process. In contrast, if it is determined that the system has stopped (S81/Yes), the processor 51 may end the process.

As described above, the object recognition apparatus 30 according to the example embodiment performs the predetermined first object recognition process for the short-distance region in which the distance from the predetermined base point L0 is equal to or less than the first distance L1 set as the minimum distance that allows for object recognition by the object recognition process based on the image data of the camera 33. The object recognition apparatus 30 performs the predetermined second object recognition process different from the first object recognition process, for the middle-distance region in which the distance from the predetermined base point L0 is greater than the first distance L1 and is equal to or less than the second distance L2 set as an upper limit of the distance that allows for object recognition by the object recognition process based on the image data. The object recognition apparatus 30 performs the predetermined third object recognition process different from the first object recognition process and the second object recognition process, for the long-distance region in which the distance from the predetermined base point L0 is greater than the second distance L2. This makes it possible to improve object recognition accuracy in each region by making use of the respective characteristics of the LiDAR 31 and the camera 33.

For example, in the middle-distance region in which the spatial resolution of the camera 33 is higher than the spatial resolution of the LiDAR 31, the object recognition apparatus 30 may primarily identify the middle-distance cluster of the detection target, based on the point group data of the LiDAR 31, and complement the recognized data, such as the distance, the type, and the movement speed of the detection target object, based on the image data on the determination region including the middle-distance cluster. This makes it possible to improve the object recognition accuracy by making use of the respective characteristics of the LiDAR 31 and the camera 33, while reducing the load of processing on the image data.

In addition, in the long-distance region in which the spatial resolution of the camera 33 is lower than the spatial resolution of the LiDAR 31, the object recognition apparatus 30 according to the example embodiment may perform the super-resolution processing for the image data on the determination region including the long-distance cluster, and thereafter perform the object recognition process based on the image data. Thus, even in the long-distance region, the object recognition process is performed based on the image data having a resolution higher than the spatial resolution of the LiDAR 31, which makes it possible to improve the object recognition accuracy. Note that, because the long-distance region is a region away from the vehicle 1, performing such super-resolution processing does not result in a significantly high risk of approaching or contacting the object existing in the long-distance region.

In addition, the object recognition apparatus 30 according to the example embodiment performs the object recognition process based on the point group data of the LiDAR 31, in the short-distance region less than the first distance L1 in which the object recognition accuracy by the object recognition process based on the image data of the camera 33 is low. Consequently, in the region with low accuracy of object recognition by the camera 33, for example, distance recognition is performed based on the point group data of the LiDAR 31, allowing for highly urgent coping such as a notification operation or an avoidance operation.

4. Other Example Embodiments

Although the object recognition apparatus 30 according to an example embodiment of the disclosure has been described, various modifications may be made to the object recognition apparatus 30 according to the example embodiment described above.

4-1. Modification Example 1

The object recognition apparatus 30 according to the above-described example embodiment may cause the LiDAR 31 to apply the laser light to makes it possible to recognize the detection target object in all the regions of the short-distance region, the middle-distance region, and the long-distance region, but the technique of the disclosure is not limited to the above-described example. For example, the ranging sensor driving controller 62 may cause the laser light to be applied differently in different periods, i.e., a period in which the laser light is applied with the minimum scan angle between the irradiation points and the irradiation energy set to make the minimum detection size between the irradiation points on the virtual unit plane of the middle-distance region and the long-distance region less than a predetermined value, and a period in which the laser light is applied with the minimum scan angle between the irradiation points and the irradiation energy set to make the minimum detection size between the irradiation points on the virtual unit plane of the short-distance region less than a predetermined value.

In other words, the ranging sensor driving controller 62 may cause the LiDAR 31 to apply, in different periods, the laser light of the predetermined energy band that allows for detection of the middle-distance region and the long-distance region and the laser light of an energy band other than the predetermined energy band. This makes it possible to keep the object recognition accuracy in the short-distance region at a high level.

4-2. Modification Example 2

The object recognition apparatus 30 adjusts, based on data on a traveling environment of the vehicle 1, respective time periods for which the first object recognition process and the second object recognition process are to be performed, or a ratio between respective ranges in which the first object recognition process and the second object recognition process are to be performed in a measurement range in which the object recognition process is to be performed. For example, the ranging sensor driving controller 62 may determine whether the vehicle 1 is in a situation of high necessity for object recognition in the short-distance region, based on the data on the traveling environment of the vehicle 1. When it is determined that the vehicle 1 is in the situation of high necessity for object recognition in the short-distance region, the ranging sensor driving controller 62 may increase an irradiation time or the irradiation range of the laser light for performing the object recognition process for the short-distance region. This makes it possible to concentratedly allocate resources of the object recognition process by the LiDAR 31 to the short-distance region.

Figure 11:
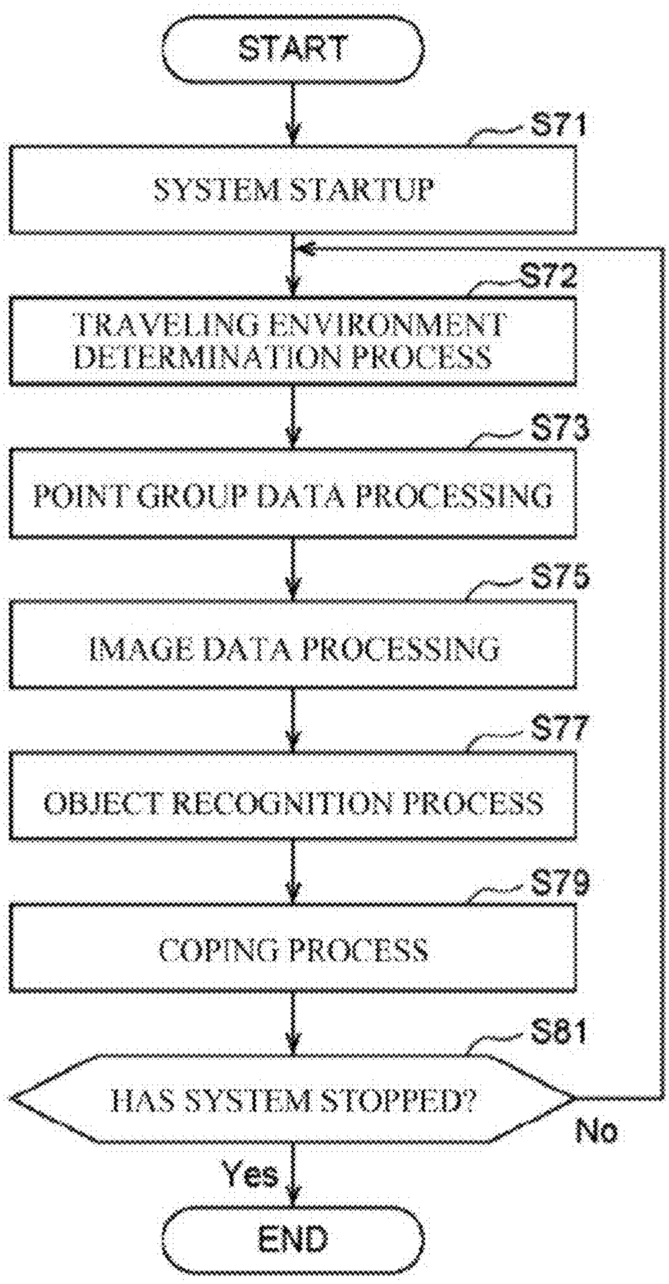
FIG. 11 is a flowchart illustrating an object recognition processing method performed by the object recognition apparatus according to one modification example of the disclosure.

FIG. 11 is a flowchart illustrating an object recognition processing method performed by the processing device 50 of the object recognition apparatus 30 according to Modification Example 2. The flowchart illustrated in FIG. 11 may additionally include a traveling environment determination process (step S72) in the flowchart illustrated in FIG. 10.

When the processor 51 of the processing device 50 detects a startup of the system (step S71), the ranging sensor driving controller 62 may perform the traveling environment determination process of determining whether the vehicle 1 is in the situation of high necessity for object recognition in the short-distance region, based on the data on the traveling environment of the vehicle 1 (step S72). For example, the ranging sensor driving controller 62 may determine whether the vehicle 1 is placed in a traveling environment estimated to include a large number of objects that can be an obstacle to the vehicle 1 within a small distance range from the vehicle 1. When it is determined that the vehicle 1 is in the situation of high necessity for object recognition in the short-distance region, the ranging sensor driving controller 62 may concentrate the allocation of the resources of the object recognition process by the LiDAR 31 on the short-distance region.

Figure 12:
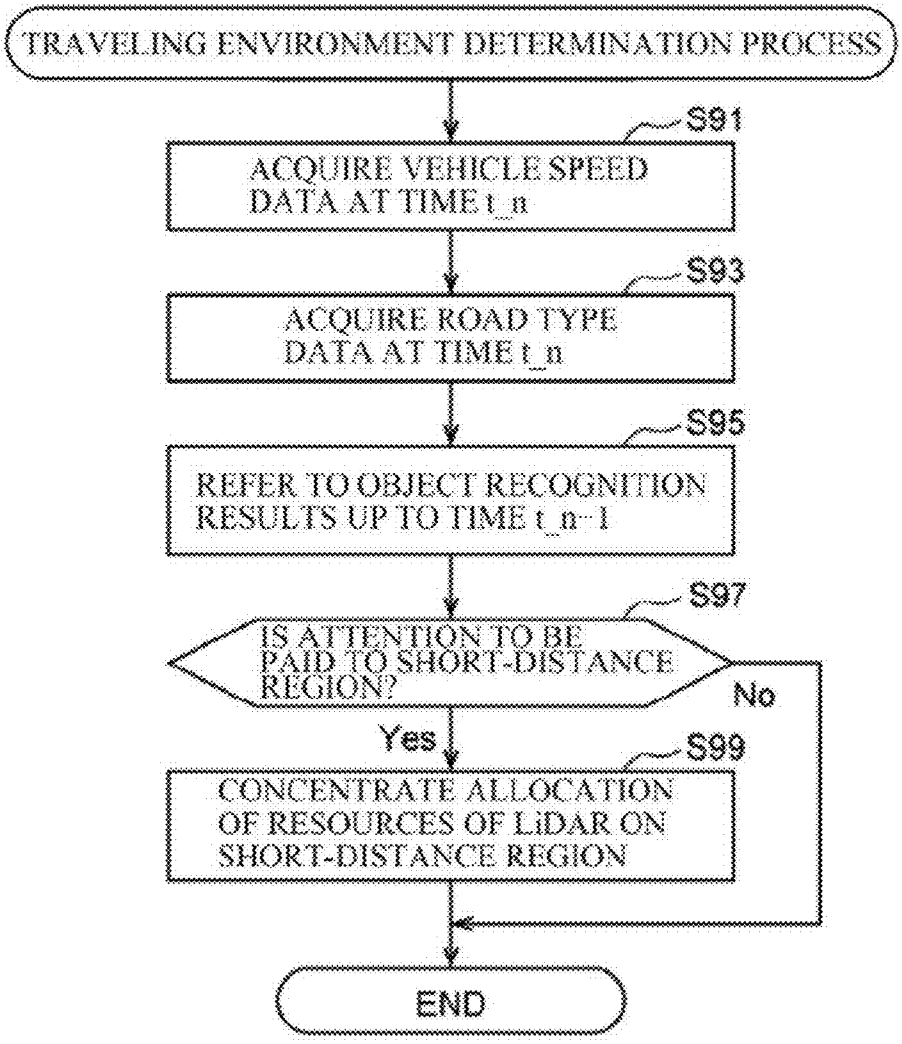
FIG. 12 is a flowchart illustrating a routine of a traveling environment determination process performed by the object recognition apparatus according to one modification example.

FIG. 12 is a flowchart illustrating an example of the traveling environment determination process.

The ranging sensor driving controller 62 may acquire data on a vehicle speed of the vehicle 1 at the time t_n (step S91). The data on the vehicle speed may be a sensor signal of a vehicle speed sensor or may be acquired from another control unit having the data on the vehicle speed.

Thereafter, the ranging sensor driving controller 62 may acquire road type data at the time t_n (step S93). The road type data may be data indicating a type of a road on which the vehicle 1 is traveling, and may be recorded in, for example, map data. Examples of the data on the type of the road may include data on one or more of the following: a residential road, a shopping district, a main road, a city highway, an inter-city highway, a school route, a road width, whether there is a sidewalk, whether there is a guardrail, whether there is a curb, and time of passage, i.e., a current time. The ranging sensor driving controller 62 may determine whether the road on which the vehicle 1 is traveling is an environment with a large number of pedestrians or bicycles, or a narrow road, for example, based on the road type data.

For example, the ranging sensor driving controller 62 may acquire the data on the type of the road recorded in the map data, based on a traveling position of the vehicle 1 and the map data. The traveling position may be identified by a position detecting sensor, such as a global positioning system (GPS) sensor. The ranging sensor driving controller 62 may acquire the data on the type of the road on which the vehicle 1 is traveling by communication with another vehicle or an external system.

Thereafter, the ranging sensor driving controller 62 may acquire data on the results of the object recognition process up to the previous calculation cycle at a time t_n-1 (step S95). For example, the ranging sensor driving controller 62 may read the data on the result of the object recognition process recorded in the storage 53.

Thereafter, the ranging sensor driving controller 62 may determine whether the traveling environment of the vehicle 1 is a traveling environment in which attention is to be paid to the short-distance region (step S97). For example, the ranging sensor driving controller 62 may determine that attention is to be paid to the short-distance region in the traveling environment, when it is determined that the vehicle 1 is traveling in a shopping district with a large number of pedestrians or bicycles, or when it is determined that the vehicle 1 is traveling on a school route during commute time to and from school. However, the method of determining whether the traveling environment of the vehicle 1 is the traveling environment in which attention is to be paid to the short-distance region is not limited to the above-described examples.

If it is determined that the traveling environment of the vehicle 1 is the traveling environment in which attention is to be paid to the short-distance region (S97/Yes), the ranging sensor driving controller 62 may record that the resources of the object recognition process by the LiDAR 31 are to be concentrated on the short-distance region (step S99), and end the traveling environment determination process. In contrast, if the ranging sensor driving controller 62 does not determine that the traveling environment of the vehicle 1 is the traveling environment in which attention is to be paid to the short-distance region (S97/No), the ranging sensor driving controller 62 may directly end the traveling environment determination process.

Returning to FIG. 11, after performing the traveling environment determination process, the processor 51 may perform the processes of step S73 and the subsequent steps of the flowchart illustrated in FIG. 10. In this case, if it is not determined that the traveling environment of the vehicle 1 is the traveling environment in which attention is to be paid to the short-distance region (S97/No) in step S72, the processor 51 may perform the processes of step S73 and the subsequent steps along the procedure performed by the object recognition apparatus 30 according to the example embodiment described above.

In contrast, if it is determined that the traveling environment of the vehicle 1 is the traveling environment in which attention is to be paid to the short-distance region (S97/Yes) in step S72, the processor 51 may concentrate the resources of the object recognition process by the LiDAR 31 on the short-distance region in the first object recognition process for the short-distance region. For example, the ranging sensor driving controller 62 may increase the irradiation time or the irradiation range of the laser light with, for example, the irradiation energy and an irradiation density adjusted to perform the object recognition process for the short-distance region. The ranging sensor driving controller 62 may thus increase the irradiation density of the laser light for performing the object recognition process for the short-distance region, or increase the irradiation energy of each piece of the laser light.

In this case, the short-distance cluster identified by the first object recognition process illustrated in FIG. 7 is a cluster that is measured with high accuracy, and the object recognition process is performed based on the short-distance cluster measured with high accuracy. Consequently, when a risk level is high in the short-distance region in which the object recognition process using the image data has low accuracy, it is possible to increase the object recognition accuracy in the short-distance region, making it possible to improve responsiveness of, for example, the notification process or the automated driving control process for the vehicle 1.

Although the disclosure has been described hereinabove in terms of the example embodiment and modification examples, the disclosure is not limited thereto. It should be appreciated that variations may be made in the described example embodiment and modification examples by those skilled in the art without departing from the scope of the disclosure as defined by the following claims. The limitations in the claims are to be interpreted broadly based on the language employed in the claims and not limited to examples described in this specification or during the prosecution of the application, and the examples are to be construed as non-exclusive. As used in this specification and the appended claims, the singular forms "a," "an," and "the" include, especially in the context of the claims, are to be construed to cover both the singular and the plural, unless otherwise indicated herein or clearly contradicted by context. Throughout this specification and the appended claims, unless the context requires otherwise, the terms "comprise", "include", "have", and their variations are to be construed to cover the inclusion of a stated element, integer, or step but not the exclusion of any other non-stated element, integer, or step. The use of the terms first, second, etc. do not denote any order or importance, but rather the terms first, second, etc. are used to distinguish one element from another. The term "substantially", "approximately", "about", and its variants having the similar meaning thereto are defined as being largely but not necessarily wholly what is specified as understood by one of ordinary skill in the art. The term "disposed on/provided on/formed on" and its variants having the similar meaning thereto as used herein refer to elements disposed directly in contact with each other or indirectly by having intervening structures therebetween.

For example, in the above-described example embodiment, the short-distance region and the middle-distance region, and the middle-distance region and the long-distance region may be clearly defined at the boundaries, and the predetermined process may be performed in each region, but the technique of the disclosure is not limited to such an example. For example, when the distance to the detected object changes across the short-distance region and the middle-distance region or across the middle-distance region and the long-distance region, the region may be gradually changed or overlapped near the boundary between the regions. This makes it possible to prevent the result of the object recognition process from becoming unstable due to a sudden change in the object recognition processing method.

The processing device 50 illustrated in FIG. 4 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the processing device 50. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the processing device 50 illustrated in FIG. 4.

The invention claimed is:

1. An object recognition apparatus comprising:

a ranging sensor configured to measure at least distances to reflection points based on reflected waves of applied irradiation waves;

a camera configured to generate image data on an imaging range; and one or more processors configured to perform an object recognition process based on measurement data of the ranging sensor and the image data of the camera, wherein the one or more processors are configured to perform, as the object recognition process, a predetermined first object recognition process for a short-distance region in which a distance from a predetermined base point is equal to or less than a first distance set as a minimum distance that allows for object recognition by the object recognition process based on the image data, a predetermined second object recognition process different from the first object recognition process, for a middle-distance region in which the distance from the predetermined base point is greater than the first distance and is equal to or less than a second distance set as an upper limit of a distance that allows for the object recognition by the object recognition process based on the image data, and a predetermined third object recognition process different from the first object recognition process and the second object recognition process, for a long-distance region in which the distance from the predetermined base point is greater than the second distance, perform the object recognition process using the measurement data in the first object recognition process, perform the object recognition process using the measurement data and the image data in the second object recognition process, and adjust, based on data on a traveling environment of a mobile body, respective time periods for which the first object recognition process and the second object recognition process are to be performed, or a ratio between respective ranges in which the first object recognition process and the second object recognition process are to be performed in a measurement range in which the object recognition process is to be performed.

2. The object recognition apparatus according to claim 1, wherein the one or more processors are configured to perform the object recognition process by performing super-resolution processing using the image data acquired in time series, in the third object recognition process for the long-distance region.

3. An object recognition processing method comprising:

performing an object recognition process based on measurement data of a ranging sensor and image data of a camera, the ranging sensor being configured to measure at least distances to reflection points based on reflected waves of applied irradiation waves, the camera being configured to generate the image data on an imaging range, the object recognition process comprising performing a predetermined first object recognition process for a short-distance region in which a distance from a predetermined base point is equal to or less than a first distance set as a minimum distance that allows for object recognition by the object recognition process based on the image data, performing a predetermined second object recognition process different from the first object recognition process, for a middle-distance region in which the distance from the predetermined base point is greater than the first distance and is equal to or less than a second distance set as an upper limit of a distance that allows for the object recognition by the object recognition process based on the image data, and performing a predetermined third object recognition process different from the first object recognition process and the second object recognition process, for a long-distance region in which the distance from the predetermined base point is greater than the second distance, the first object recognition process comprising performing the object recognition process using the measurement data, the second object recognition process comprising performing the object recognition process using the measurement data and the image data; and adjusting, based on data on a traveling environment of a mobile body, respective time periods for which the first object recognition process and the second object recognition process are to be performed, or a ratio between respective ranges in which the first object recognition process and the second object recognition process are to be performed in a measurement range in which the object recognition process is to be performed.

4. A non-transitory tangible computer readable recording medium containing a computer program, the computer program causing, when executed by a computer, the computer to implement a method, the method comprising:

performing an object recognition process based on measurement data of a ranging sensor and image data of a camera, the ranging sensor being configured to measure at least distances to reflection points based on reflected waves of applied irradiation waves, the camera being configured to generate the image data on an imaging range, the object recognition process comprising performing a predetermined first object recognition process for a short-distance region in which a distance from a predetermined base point is equal to or less than a first distance set as a minimum distance that allows for object recognition by the object recognition process based on the image data, performing a predetermined second object recognition process different from the first object recognition process, for a middle-distance region in which the distance from the predetermined base point is greater than the first distance and is equal to or less than a second distance set as an upper limit of a distance that allows for the object recognition by the object recognition process based on the image data, and performing a predetermined third object recognition process different from the first object recognition process and the second object recognition process, for a long-distance region in which the distance from the predetermined base point is greater than the second distance, the first object recognition process comprising performing the object recognition process using the measurement data, the second object recognition process comprising performing the object recognition process using the measurement data and the image data; and adjusting, based on data on a traveling environment of a mobile body, respective time periods for which the first object recognition process and the second object recognition process are to be performed, or a ratio between respective ranges in which the first object recognition process and the second object recognition process are to be performed in a measurement range in which the object recognition process is to be performed.

* * * * *